Dec. 22, 1953     W. C. DOLCH     2,663,150
HYDRAULIC SYSTEM AND MULTIPURPOSE CONTROL VALVE
Filed May 16, 1950     3 Sheets-Sheet 1

INVENTOR.
WILLIAM C. DOLCH
BY
Leech & Radue
ATTORNEYS

INVENTOR.
WILLIAM C. DOLCH
BY
Leech & Radue
ATTORNEYS

Dec. 22, 1953 W. C. DOLCH 2,663,150
HYDRAULIC SYSTEM AND MULTIPURPOSE CONTROL VALVE
Filed May 16, 1950 3 Sheets-Sheet 3

INVENTOR.
WILLIAM C. DOLCH
BY
*Leech r Radue*
ATTORNEYS

Patented Dec. 22, 1953

2,663,150

UNITED STATES PATENT OFFICE 2,663,150

HYDRAULIC SYSTEM AND MULTIPURPOSE CONTROL VALVE

William C. Dolch, Willoughby, Ohio, assignor, by mesne assignments, to The New York Air Brake Company, New York, N. Y., a corporation of New Jersey Application May 16, 1950, Serial No. 162,250

4 Claims. (Cl. 60—97)

This invention relates to hydraulic systems and multi-purpose valves for use therewith, and more particularly to such systems and valves for use with industrial "lift" trucks similar to those known as "fork" trucks.

It is a general object of the present invention to provide a novel and improved hydraulic system and novel and improved multi-purpose valves for use with such systems.

More particularly it is an object of the invention to provide a system including one or more hydraulic power elements of the ram or hoist type adapted for use with the full working pressure supplied by a relatively constant speed, constant volume pump and one or more similar power elements intended for operation at a selected lower pressure, together with manual and automatic control means comprised in a unitary structure for joint or independent control of the two types of power elements.

An important object of the invention resides in the construction and arrangement of a multipurpose valve unit including a manual control valve of the central by-pass type capable of delivering pumped liquid to power elements or permitting it to return from them to a reservoir, a selector valve which permits pumped liquid to be delivered optionally to all power units or selectively to either those operating at reduced pressure or those operating at full pressure, together with an automatic flow control valve providing the necessary back pressure during a "release" operation to maintain the control condition of a pressure regulating valve effecting the reduced pressure.

Another important object of the invention consists in the simplified arrangement of the valve housing, providing total internal communications in drilled and cored passages between the several control valves.

Among the important features of the invention may be mentioned the flexibility of control achieved by the system and arrangement of multi-purpose valves, the simplicity of piping, the elimination of duplicate function elements, the widespread versatility of the system and apparatus to commercial devices adaptable to wide fields of endeavor and the extreme ease of operation.

Other and further objects and features of the invention will be more apparent to those skilled in the art upon a consideration of the accompanying drawings and following specification, wherein is disclosed a single exemplary embodiment of the invention, with the understanding that such changes and modifications may be made therein as fall within the scope of the appended claims without departing from the spirit of the invention.

The system and apparatus of the present invention were designed primarily for what are commercially known as lift or fork trucks used in industry for many purposes of short distance transportation, lifting, loading, unloading, stacking and the like. Such trucks take many forms dependent on the use, but in general they may be said to comprise small, self-propelled multi-wheeled vehicles mounting at the front a vertical mast for guidance of a lift carriage which may move from a position approximately at ground level to a height of six or eight feet or more under the action of a hydraulic cylinder which is hereinafter referred to as the "lift" cylinder. The carriage may be provided with forks which may be run under an object for lifting it, but whether equipped with forks or arranged without them the carriage may also be provided with grippers for engaging the sides of an object being lifted, either to hold it in position on the forks or to grip it sufficiently tightly for lifting it without the use of forks. The operation of these devices is under the control of a hydraulic cylinder, hereinafter referred to as the "grip" cylinder. Such cylinders are normally single acting, return movement being accomplished by the weight of the carriage or load, or in the case of grippers, by springs.

The system and apparatus of the present invention is of universal application to various forms of lift trucks, for it provides control for the lift cylinder and the grip cylinder when the truck does not have forks. It provides individual or simultaneous control of lift and gripper cylinders on a truck equipped with forks. It will also provide lifting control for a truck not equipped with gripper means. A truck equipped with the system of the present invention will be capable of performing the work of several conventional single purpose trucks.

Figure 6:
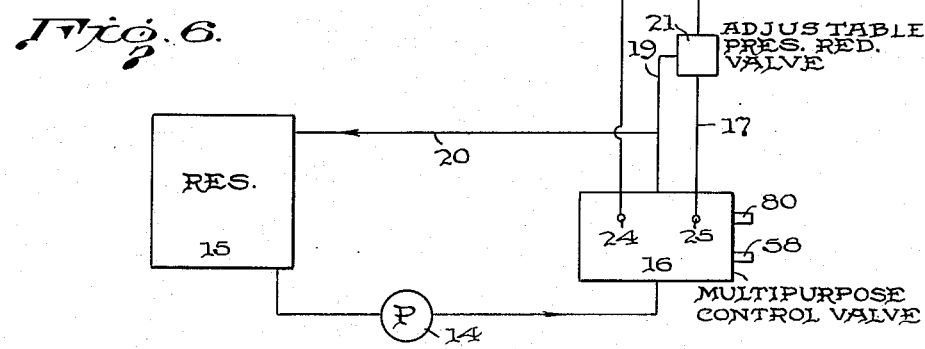
Fig. 6 is a diagrammatic and schematic showing of a representative system arranged in accordance with the present invention.

Referring now to the drawings for a better understanding of the invention, and first to Fig. 6, there is illustrated diagrammatically a hydraulic system showing two single acting ram type cylinders 10 and 12 which will be referred to respectively as "grip" and "lift" cylinders although their functions may be materially varied from these uses. A more or less conventional hydraulic fluid supply system is associated with these cylinders and includes the relatively constant speed, constant volume pump 14 which takes liquid from reservoir 15 and delivers it under pressure to the multi-purpose valve 16. From this valve lines 17 and 18 lead respectively to cylinders 10 and 12. Interposed in line 17 is a pressure reducing valve which has its by-pass line 19 connected to the by-pass line 20 for valve 16, which line leads back to the reservoir.

The pump, reservoir and cylinders are conventional while the pressure reducing valve may be of any suitable type capable of continuously maintaining a lower pressure for operating the grip cylinder than is provided by the pump for operating one or more lift cylinders. Such a valve responds to pressure on its low side and can be preset to determine the lowered pressure which it maintains. It is preferred to use a pressure reducing valve such as shown in the copending application of Hugh J. Stacey, Serial No. 152,209, filed March 27, 1950.

Figure 1:
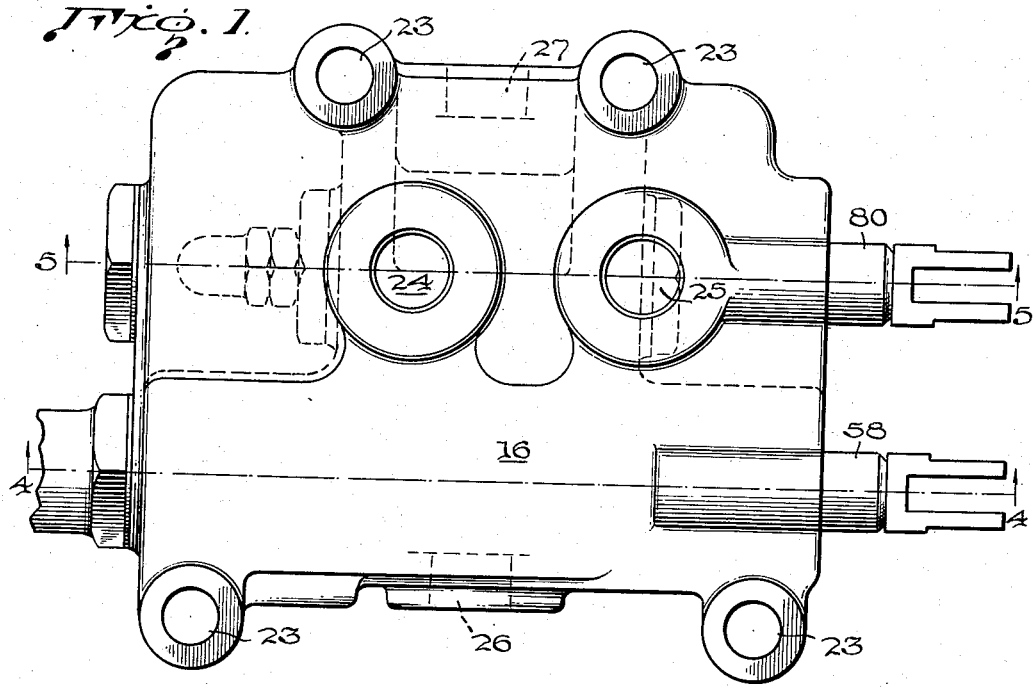
Fig. 1 is a top plan view of the multi-purpose control valve forming a portion of the present invention.

The valve 16, referred to as a multi-purpose control valve, is more fully disclosed in the remaining figures of the drawing herewith. It is composed of suitable valve members arranged in a single one-piece cast metal housing having appropriate bores and cored passages and chambers therein, as will be later defined. Fig. 1 is a plan view, and this gives a reference plane for referring to the sections and elevations of the other views, but obviously the valve may be mounted in any desired position by means of bolts passing through the holes 23 formed therein. In the top surface are provided a pair of ports 24 and 25, and preferably the first of these is connected to the lift cylinder and the second to the grip cylinder, and this arrangement will be used for defining the operation, but obviously a reversal of the connections will only require movement of the selector valve plunger in the opposite direction to achieve the desired results. These ports are appropriately reinforced and threaded to receive pipe connections, as better seen in Fig. 5. On the lower side wall as viewed in Fig. 1 there is an inlet port 26 which receives high pressure liquid directly from the pump and opposite on the upper side wall is the discharge port 27 from which liquid is returned to the reservoir.

Figure 3:
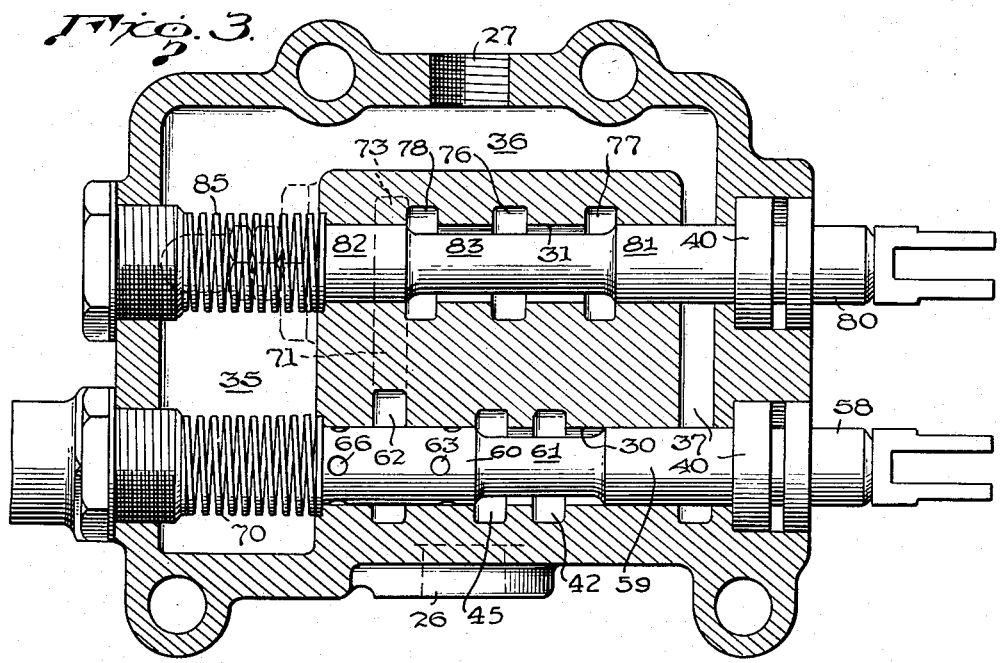
Fig. 3 is a horizontal section through the axes of the valve plungers and taken on the plane of line 3—3 of Fig. 2.

The housing, which is generally rectangular in plan, elevation and end view, is drilled from end to end, forming four parallel bores, shown as 30, for the manual control plunger, 31, for the manual selector plunger, 32, (Fig. 5) for the automatic flow control plunger, and 33, for the relief valve. Bores 30, 31 and 33 terminate in low pressure chamber 35, best seen in Figs. 3, 4 and 5, which is connected to an L-shaped extension 36, 37 opening to the reservoir port 27 and intersecting bores 30 and 31 to drain off any seepage which may leak along the valve plungers and thus prevent the seals 40 from being put under high pressure. One additional passage 41 of L-shape connects the low pressure chamber 35 to chamber 42 which intersects the bore 30.

Figure 4:
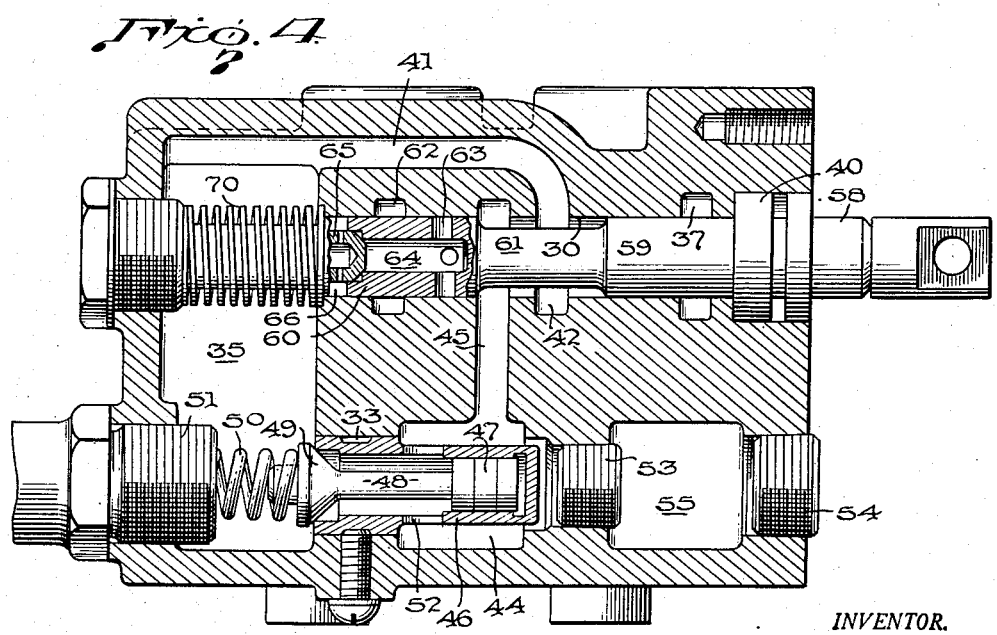
Fig. 4 is a vertical section through the control plunger axis and taken on line 4—4 of Fig. 1.

High pressure liquid from the pump is introduced through port 26, which enters the cored chamber 44 surrounding a portion of the bore 33, and charges passage 45 which intersects bore 30 only. To provide for venting this high pressure liquid, at times when the pump pressure becomes too great as when no liquid is used, a relief valve assembly is incorporated in bore 33 and comprises the closed end cylindrical sleeve 46 secured in bore 33 by the lock screw shown and accommodating at its closed end loosely fitting damper piston 47 attached by stem 48 to conical head 49 seating on the edge of the counterbore of the left end of sleeve 46, which opens into the low pressure chamber 35 as seen in Fig. 4. A suitable helical spring 50, and its adjusting mechanism 51, which also serves to close the left end of the bore 33, holds the valve seated below the critical pressure. The liquid enters the relief valve chamber through ports 52 in the wall of its sleeve. The right end of bore 33 is closed by plug 53 and by additional plug 54 if desired at times when chamber 55 is connected to relief passage 37.

In bore 30 there is arranged with a close working fit the control plunger 58 having end lands 59 and 60 separated by groove 61, which in the neutral position of the plunger permits flow of fluid from high pressure passage 45 to low pressure chamber 42 and back to the main low pressure chamber 35 connected to the reservoir. Under these conditions the pump works against minimum pressure returning liquid to the tank against only the back pressure resulting from friction in the system. In addition to the passages already defined as intersecting bore 30 the delivery passage 62 intersects it and may be placed into cooperation with the high pressure passage by pulling out the plunger 58 until land 60 shuts off communication between 45 and 42 and radial plunger passages 63 align with high pressure passage 45, whereby liquid flows into the central chamber 64 in the plunger, lifts the check valve 65 and issues through radial ports 66 now in alignment with delivery passage 62.

When liquid is to be returned from the cylinders through delivery passage 62 to the reservoir, plunger 58 is pushed in, but the groove 61 is long enough to permit communication between 45 and 42, whereby the pump is not required to deliver against pressure. Ports 63 now register with delivery chamber 62 and returning liquid enters chamber 64 in the plunger, lifts the check valve 65 and discharges through ports 66, now positioned in low pressure chamber 35, whereby the liquid is returned to the reservoir. A conventional form of plunger centering spring 70 is arranged in chamber 35 to return the plunger to the neutral position whenever it is released.

Figure 2:
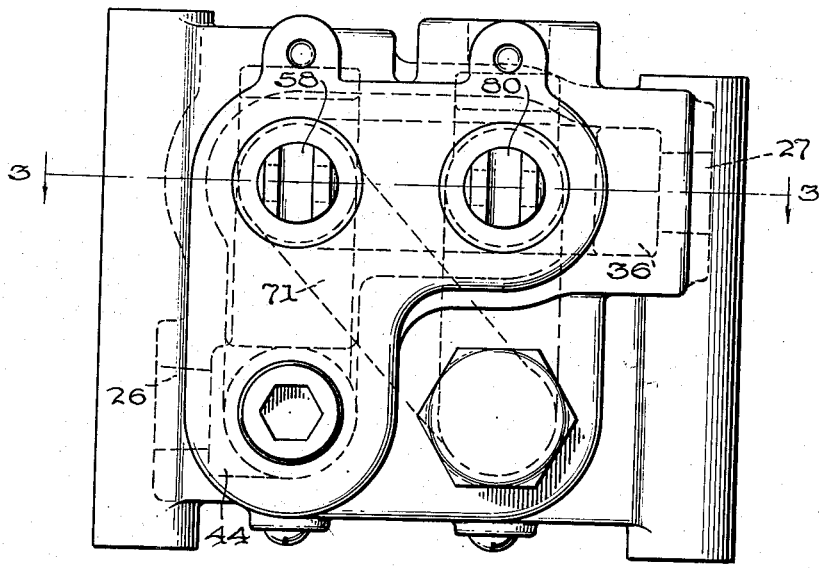
Fig. 2 is an end elevation of the same viewed from the right of Fig. 1 and showing internal passages in dotted lines.
Figure 5:
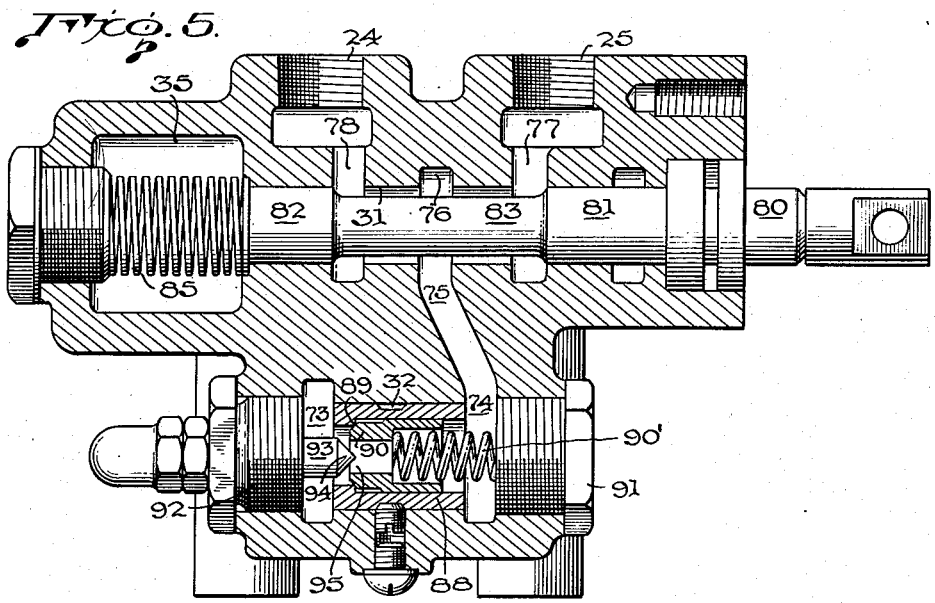
Fig. 5 is a vertical section parallel to that of Fig. 4, taken through the axis of the selector valve plunger and on line 5—5 of Fig. 1.

Delivery chamber 62 communicates with diagonal passage 71, best seen in Fig. 2, which intersects bore 32 of the flow control plunger at 73 at its left end, as best seen in Fig. 5. Forgetting for the moment the flow control plunger, the fluid may pass longitudinally through bore 32 into chamber 74 at its right end and travel by passage 75 to chamber 76 surrounding the bore 31 at its center. This bore is also intersected by "grip cylinder" chamber 77 and "hoist cylinder" chamber 78 straddling 76 and leading respectively to ports 25 and 24. The plunger 80 in this bore is extremely simple. It is of the spool type having end lands 81 and 82 and a central groove 83, which is of a length equivalent to the distance between the outer walls of chambers 77 and 78. This plunger also passes into the low pressure chamber 35 principally for convenience in mounting its centralizing spring 85.

The selector plunger 80 in its neutral position, as shown in Fig. 5, permits high pressure fluid delivered by the control valve plunger 58 through chamber 62, passage 71, chamber 73, flow control plunger bore, chamber 74, passage 75 and chamber 76 to the center of the selector plunger bore, where it moves in two directions to actuate the lift and grip cylinders, as will be obvious from Fig. 6. If the selector plunger 80 is pulled out its land 82 closes off chamber 78 and liquid is delivered only to the grip cylinder, but if plunger 80 is pushed in its land 81 closes off chamber 77 and high pressure liquid is supplied only to the hoist cylinder. Obviously liquid may be released from either or both cylinders in the same manner upon a proper setting of the control valve.

The flow control valve is shown best in Fig. 5. Its bore 32 receives a tight fitting sleeve 88 open at both ends and extending only to the chambers 73 and 74. This is counterbored to form a circumferential stop 89 near the left end. A tubular plunger 90 is slidably mounted in the cylinder 88 and has its left end reduced somewhat in diameter and provided with a taper to cooperate with the stop 89 under the action of its helical spring 90' positioned by cap 91 closing the right end of the bore 32. At the opposite end a plug 92 closes the bore and is internally threaded to pass a threaded rod having the cylindrical inner portion 93 terminated by a conical tip 94 adjustable in and out toward the through bore 95 in the plunger 90. Since the plunger always stops against stop 89 under the action of spring 90', adjustment of the conical tip 94 in and out determines the rate of flow through the flow control plunger, but only from 74 toward 73. Flow in the opposite direction, if greater than can be accommodated by the normal opening between tip 94 and bore 95, serves to compress the spring 90' to open the passage until it will accommodate as much liquid as will the bore 95. This valve is thus in a sense a partially closing check valve.

For a full understanding of the operation of the system and the multi-purpose valve, reference should be had again to Fig. 6. If it is assumed that the lift cylinder expands, for instance, to lift a fork on a conventional fork truck and the gripper cylinder expands to actuate grippers for holding the load on the forks, and it is assumed that much more effort is required to lift than to grip, it will be seen that some means must be provided to reduce the pressure supplied to the grip cylinder so that the grippers will not crush the goods on the fork when adequate pressure is applied for the lifting. This function is performed by pressure reducing valve 21 which regulates the pressure of liquid discharged from it so that high pressure supplied by the pump reaches only the lift cylinder when the valve plungers are in the appropriate positions. The maximum pressure ever reaching the grip cylinder is that permitted by the presetting of the reducing valve.

Considering now the system in Fig. 6, with the pump in operation and both valve plungers in neutral position, liquid enters at 26 into chamber 44, into passage 45 and into bore 30, where by way of the undercut 61 it enters chamber 42, passage 41 and is returned to the reservoir through port 27. If plunger 58 is now pulled out, high pressure liquid can no longer reach chamber 42 because of land 60. Ports 63 align with 45 and ports 66 with chamber 62. Liquid thus lifts check plunger 65, passes into delivery passage 62, follows diagonal passage 71 to chamber 73 at the left end of the flow control plunger bore. Here it passes by point 94 through bore 95 into chamber 74, through passage 75 to chamber 76, through groove 83 in plunger 80 to chambers 77 and 78 and to the grip and hoist cylinders respectively. Liquid flowing to the grip cylinder must first pass the pressure reducing valve 21 and be reduced to a safe pressure. If the regulating screw in the flow control valve is set to a nearly closed position, this restriction may cause the flow control plunger to move toward the right to allow unrestricted flow. Both cylinders are actuated and the load is gripped and lifted.

If at the end of the above operation the control plunger 58 is pushed in, liquid from the pump is by-passed through channel 61 but delivery passage 62 is connected to low pressure chamber 35 via radial ports 63, plunger bore 64 and radial ports 66. Liquid then begins to return from the lift cylinder to the reservoir, but the gripper cylinder does not let go because of the action of the flow control valve, which is now closed to its minimum opening and provides a liquid pressure, resulting from the weight on the truck forks, which is greater than that for which the pressure regulating valve 21 is set. Under these conditions this valve remains set to hold the pressure on the grip cylinder. Only when the fork reaches the bottom of its travel and no liquid pressure results from holding up its load does the pressure reduce sufficiently so that the grip cylinder releases and the load can be removed.

When the grip means is also used as the load supporting means, in the absence of the customary forks, a slightly different mode of operation is advisable. The lift cylinder and the grip cylinder must be capable of independent operation as well as simultaneous operation. Thus if the selector plunger is pulled out and then the manual control plunger operated as previously noted, only the grip cylinder will be energized. Similarly if the selector plunger is pushed in only the lift cylinder will be operated and the carriage can be elevated empty for gripping a load from the top of the pile.

When the gripping means are also the load supporting means more pressure may be required to operate the grippers than is required to raise the lift cylinder when no load is being raised. Hence the usual method of raising the lift cylinder (say only part way) is to push in the selector valve plunger and then pull out the control valve plunger so that the lift cylinder is actuated while the grip cylinder remains inoperative. With the selector plunger pushed in and the other plunger pushed in the lift cylinder will be released for lowering while the grip cylinder remains inactive. Similarly with the selector valve pulled out the grip cylinder will operate when the control plunger is pulled out and be retracted when it is pushed in, under the action of a spring or the like, while the lift cylinder remains inactive.

To lift a load when no forks are used, the grippers are centered about the object to be lifted, the selector plunger pulled out and the control plunger pulled out, allowing liquid to expand the grip cylinder and engage the gripping means with the load. On release of the selector plunger it returns to neutral to allow the activating liquid to expand the lift cylinder. The pressure reducing valve prevents excess gripping pressure which might damage the load.

It will be seen from the several examples given above that the operator has available by the proper sequential operation of the two plungers means for performing any of the operations of which several different types of trucks are normally capable so that the system is truly a universal one. The system is in many respects superior to so-called fully automatic systems, since the operator retains a sense of "feel" and is thus able to predict what is going to happen when the control plungers are moved.

I claim:

1. In a hydraulic lift, the combination of a single-acting expansible-chamber lift motor suited to operation under high hydraulic pressure, and controllable in lowering by regulating discharge flow therefrom; a single-acting expansible-chamber accessory motor adapted to operate under a lower hydraulic pressure; means defining a main path for hydraulic liquid; means defining branch paths leading from said main path to respective ones of said motors; a pressure-reducing valve interposed in the branch path leading to the accessory motor and serving to limit the hydraulic pressure which can be developed in the accessory motor; an asymmetric flow valve device interposed in said main path and arranged to permit substantially free flow toward said branches but to restrict flow in the reverse direction; and controllable means for supplying hydraulic pressure-liquid to said main path and for exhausting it therefrom.

2. In a hydraulic lift, the combination of a single-acting expansible-chamber lift motor suited to operation under high hydraulic pressure, and controllable in lowering by regulating discharge flow therefrom; a single-acting expansible-chamber accessory motor adapted to operate under a lower hydraulic pressure; means defining a main path for hydraulic liquid; means defining branch paths leading from said main path to respective ones of said motors; a pressure-reducing valve interposed in the branch path leading to the accessory motor and serving to limit the hydraulic pressure which can be developed in the accessory motor; an asymmetric flow valve device interposed in said main path and arranged to permit substantially free flow toward said branches but to restrict flow in the reverse direction; controllable means for supplying hydraulic pressure-liquid to said main path and for exhausting it therefrom; and means for adjusting at least the backflow rate of the asymmetric flow valve, whereby the back-pressure maintained thereby during lowering of the lift motor may be coordinated with the reduced pressure established by the reducing valve.

3. In a hydraulic lift, the combination of a single-acting expansible-chamber lift motor suited to operation under high hydraulic pressure, and controllable in lowering by regulating discharge flow therefrom; a single-acting expansible-chamber accessory motor adapted to operate under a lower hydraulic pressure; means defining a main path for hydraulic liquid; means defining branch paths leading from said main path to respective ones of said motors; a pressure-reducing valve interposed in the branch path leading to the accessory motor and serving to limit the hydraulic pressure which can be developed in the accessory motor; an asymmetric flow valve device interposed in said main path and arranged to permit substantially free flow toward said branches but to restrict flow in the reverse direction; controllable means for supplying hydraulic pressure-liquid to said main path and for exhausting it therefrom; means for adjusting the backflow rate of the asymmetric flow valve; and means for adjusting the pressure-reducing valve to pre-determine the reduced pressure which it maintains.

4. In a hydraulic lift, the combination of a single-acting expansible-chamber lift motor suited to operation under high hydraulic pressure, and controllable in lowering by regulating discharge flow therefrom; a single-acting expansible-chamber accessory motor adapted to operate under a lower hydraulic pressure; means defining a main path for hydraulic liquid; means defining branch paths leading to respective motors; a pressure-reducing valve interposed in the branch path leading to the accessory motor, and serving to limit the hydraulic pressure which can be developed in the accessory motor; selector valve means interposed between the main path and the branch paths and operable to connect both branch paths to the main path, and alternatively to connect either branch path with the main path while obstructing the other branch path to lock hydraulically the corresponding motor; an asymmetric flow valve interposed in said main path and arranged to permit substantially free flow toward said branches but to restrict flow in the reverse direction; and controllable means for supplying hydraulic pressure-liquid to said main path and for exhausting it therefrom.

WILLIAM C. DOLCH.

References Cited in the file of this patent

UNITED STATES PATENTS

| Number | Name | Date |
|---|---|---|
| 2,244,213 | Patton | June 3, 1941 |
| 2,289,567 | Berglund | July 14, 1942 |
| 2,367,115 | Goepfrich | Jan. 9, 1945 |
| 2,456,320 | Repke | Dec. 14, 1948 |
| 2,470,778 | Lankovski et al. | May 24, 1949 |
| 2,489,435 | Robinson | Nov. 29, 1949 |